(12) United States Patent
Dobashi et al.

(10) Patent No.: US 8,018,112 B2
(45) Date of Patent: Sep. 13, 2011

(54) COIL WIRE FOR COIL ASSEMBLY FOR ROTARY ELECTRICAL MACHINE

(75) Inventors: Masaomi Dobashi, Kariya (JP); Akito Akimoto, Kariya (JP)

(73) Assignee: Denso Corporation, Kariya (JP)

( * ) Notice: Subject to any disclaimer, the term of this patent is extended or adjusted under 35 U.S.C. 154(b) by 126 days.

(21) Appl. No.: 12/494,656

(22) Filed: Jun. 30, 2009

(65) Prior Publication Data

US 2009/0322178 A1 Dec. 31, 2009

(30) Foreign Application Priority Data

Jun. 30, 2008 (JP) ................................. 2008-171614

(51) Int. Cl.
*H02K 3/00* (2006.01)
*H02K 23/26* (2006.01)
*H02K 27/02* (2006.01)

(52) U.S. Cl. .................... 310/180; 310/179; 310/195
(58) Field of Classification Search .................. 310/195, 310/179, 180
See application file for complete search history.

(56) References Cited

U.S. PATENT DOCUMENTS

| | | | | | |
|---|---|---|---|---|---|
| 693,579 | A | * | 2/1902 | Wait | 310/201 |
| 783,397 | A | * | 2/1905 | Behrend | 310/195 |
| 3,634,708 | A | * | 1/1972 | Fisher | 310/195 |
| 4,914,335 | A | * | 4/1990 | Horton et al. | 310/207 |
| 5,191,250 | A | * | 3/1993 | Kobayashi | 310/216.071 |
| 5,266,858 | A | * | 11/1993 | Ohmi et al. | 310/208 |
| 5,331,244 | A | * | 7/1994 | Rabe | 310/180 |
| 5,955,810 | A | * | 9/1999 | Umeda et al. | 310/208 |
| 6,051,906 | A | * | 4/2000 | Umeda et al. | 310/179 |
| 6,147,432 | A | * | 11/2000 | Kusase et al. | 310/260 |
| 6,201,332 | B1 | * | 3/2001 | Umeda et al. | 310/184 |
| 6,201,333 | B1 | * | 3/2001 | Furst | 310/201 |
| 6,268,678 | B1 | * | 7/2001 | Asao et al. | 310/201 |
| 6,281,614 | B1 | * | 8/2001 | Hill | 310/207 |
| 6,750,582 | B1 | * | 6/2004 | Neet | 310/208 |
| 6,882,077 | B2 | * | 4/2005 | Neet | 310/208 |
| 6,935,012 | B2 | * | 8/2005 | Yasuhara et al. | 29/596 |
| 7,042,129 | B2 | * | 5/2006 | Neet | 310/208 |
| 7,185,414 | B2 | * | 3/2007 | Sadiku | 29/598 |
| 7,386,931 | B2 | * | 6/2008 | Neet et al. | 29/596 |
| 2001/0019234 | A1 | | 9/2001 | Murakami et al. | |

(Continued)

FOREIGN PATENT DOCUMENTS

JP 59204458 A * 11/1984

(Continued)

*Primary Examiner* — Quyen Leung
*Assistant Examiner* — Alex W Mok
(74) *Attorney, Agent, or Firm* — Nixon & Vanderhye PC

(57) ABSTRACT

A coil wire for a coil assembly of a rotating electrical machine is provided such that sufficient space in braiding is secured when coil-wire-bundles bundling a plurality of the coil wires are braided. Each of the coil wires has a predetermined length, a plurality of straight portions and a plurality of turn portions, the straight portions linearly-extend in parallel in a first direction substantially perpendicular to the overall length direction of the coil wires, the turn portions connect two of the straight portions to be adjacent via first-kinked-portions and second-kinked-portions, the first-kinked-portions are kinked in a second direction substantially perpendicular to both the first direction and the length direction of the coil wires, the second-kinked-portions are kinked in a third direction substantially opposite to the second direction so that the turn portions are formed in a wave-shape in the length direction of the coil wires.

7 Claims, 8 Drawing Sheets

U.S. PATENT DOCUMENTS

| | | | |
|---|---|---|---|
| 2001/0038251 A1* | 11/2001 | Nakamura | 310/180 |
| 2002/0117928 A1* | 8/2002 | Yasuhara et al. | 310/201 |
| 2003/0137204 A1* | 7/2003 | Neet | 310/179 |
| 2003/0137205 A1* | 7/2003 | Neet | 310/180 |
| 2004/0040142 A1 | 3/2004 | Hirota et al. | |
| 2004/0212268 A1* | 10/2004 | Neet | 310/180 |
| 2005/0046297 A1* | 3/2005 | Chen et al. | 310/180 |
| 2006/0005376 A1 | 1/2006 | Hirota et al. | |
| 2006/0152100 A1* | 7/2006 | Chen et al. | 310/179 |
| 2006/0226727 A1* | 10/2006 | Bramson et al. | 310/180 |
| 2007/0022596 A1* | 2/2007 | Nishimura et al. | 29/596 |
| 2008/0258575 A1* | 10/2008 | Sadiku et al. | 310/207 |
| 2009/0127948 A1* | 5/2009 | Shimizu et al. | 310/71 |
| 2009/0140594 A1* | 6/2009 | Ogawa et al. | 310/195 |
| 2009/0146523 A1* | 6/2009 | Kouda et al. | 310/195 |

FOREIGN PATENT DOCUMENTS

| | | |
|---|---|---|
| JP | 04244752 A * | 9/1992 |
| JP | 2002-176752 | 6/2002 |
| JP | 2004-104841 | 4/2004 |
| JP | 2008-048488 | 2/2008 |
| JP | 2009044780 A * | 2/2009 |
| JP | 2009118703 A * | 5/2009 |
| JP | 2009130978 A * | 6/2009 |

* cited by examiner

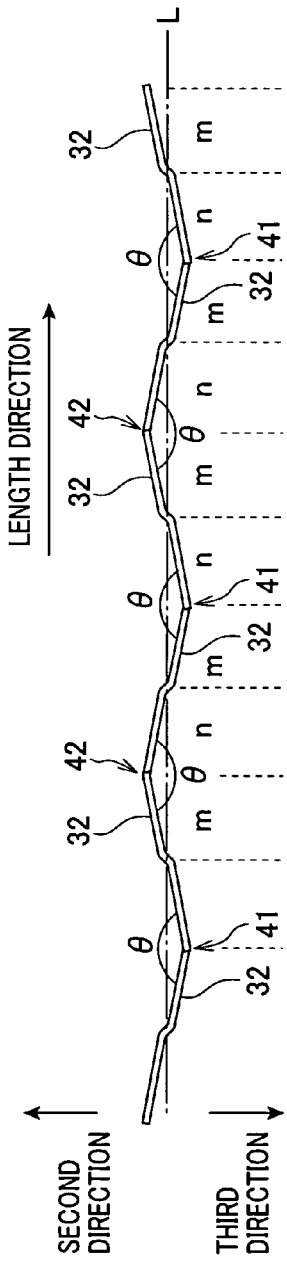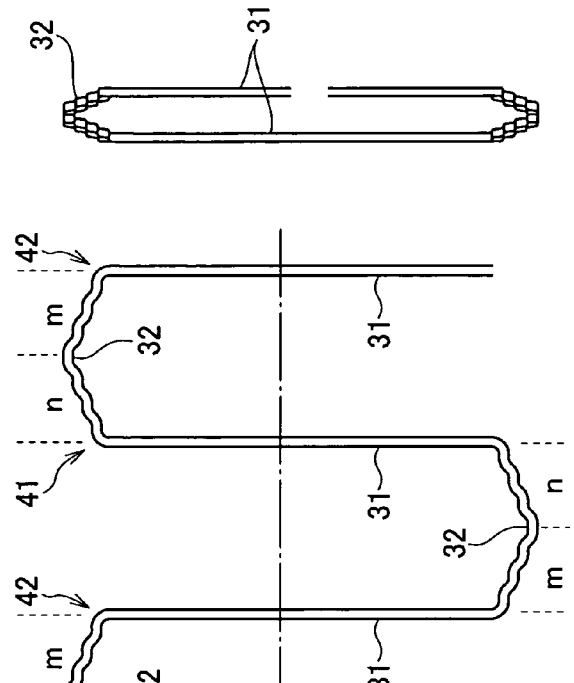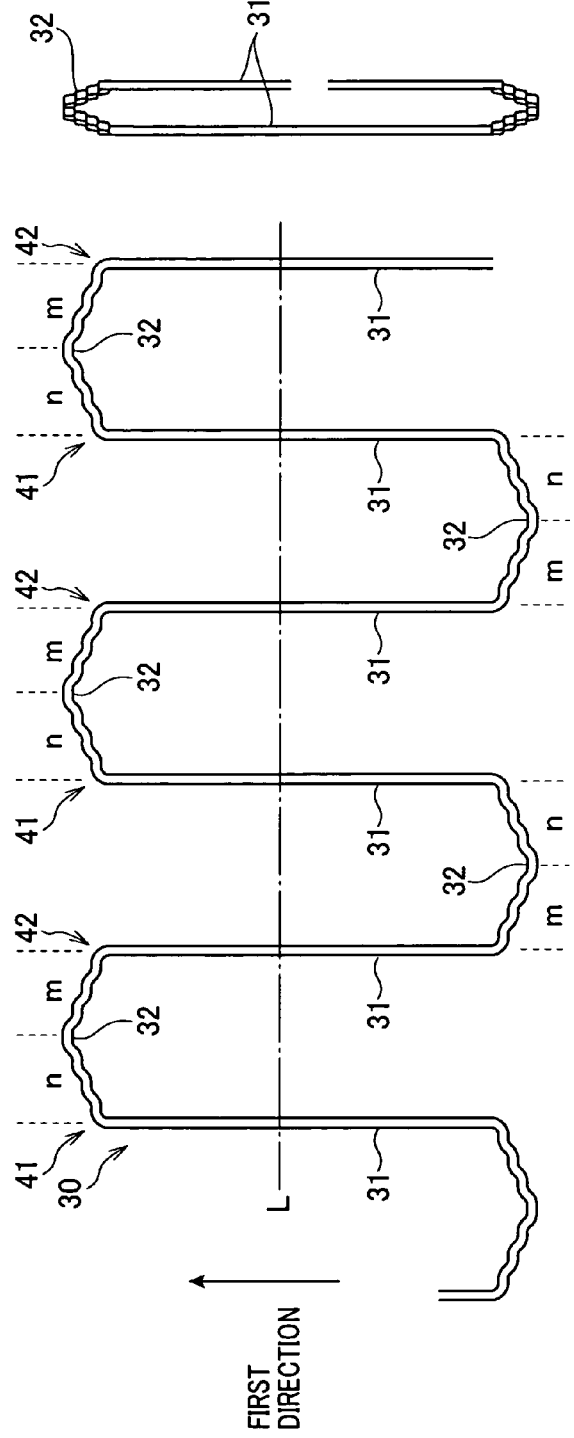

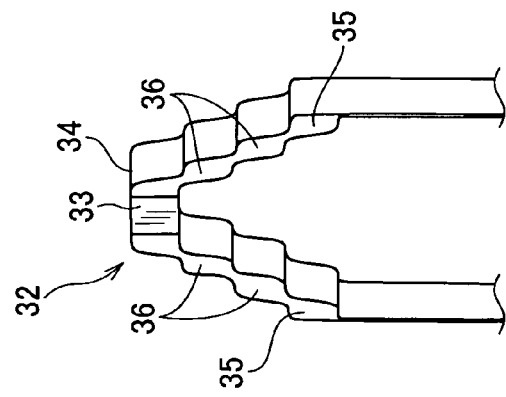
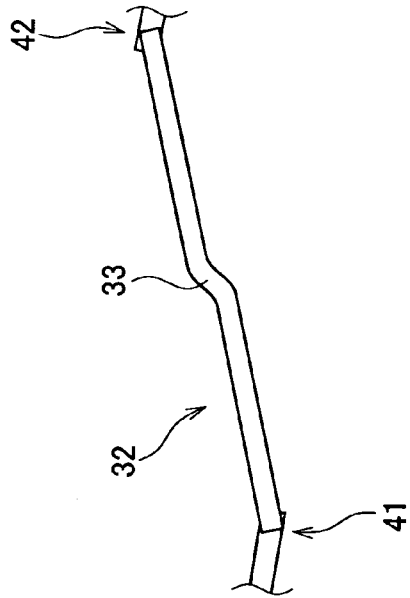
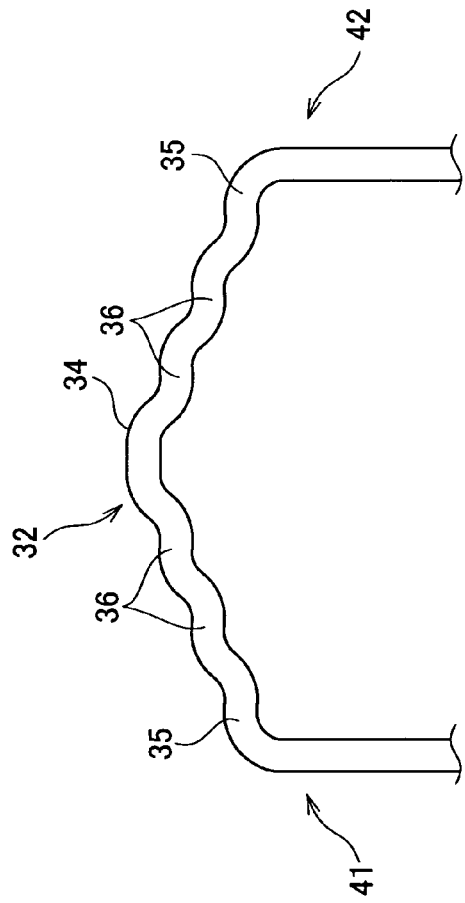

COIL WIRE FOR COIL ASSEMBLY FOR ROTARY ELECTRICAL MACHINE

CROSS-REFERENCE TO RELATED APPLICATION

This application is based on and claims the benefit of priority from earlier Japanese Patent Application No. 2008-171614 filed on Jun. 30, 2008, the description of which is incorporated herein by reference.

BACKGROUND OF THE INVENTION

1. Technical Field of the Invention

The present invention relates generally to a coil wire for a coil assembly of a rotating electrical machine.

2. Background Art

As a conventional process of manufacture of a coil assembly of rotating electrical machines, for example, as shown in Japanese patent first publication No. 2002-176752, a method of simultaneously coiling a plurality of coil wires with use of a pair of a plate-like coil core facing each other is known.

Additionally, as shown in Japanese patent first publication No. 2004-104841, by repeating a first coiling process, advancing process and second coiling process, a method of coiling a plurality of coil wires is known in which one coil wire is braided to the other coil wire with 90 degrees twist. The first coiling process is that one coil wire is coiled only 90 degrees about an axis relative to the other coil wire which is formed in a triangle-wave-shape. The advancing process is that one coil wire is accumulated in only half of the turned portion so that the more coil wires are overlapped. The second coiling process is that one coil wire is further coiled only 90 degrees about the axis.

As methods of braiding a plurality of the coil wires which is formed in a plurality of turn portions with each other, the following methods are known.

In the first known method, as carried out by a known winding machine, one coil wire is revolved around the other fixed coil wire, and the coil wire is moved in a longitudinal direction of the coils of one coil pitch per one revolution. This first method is known.

In the second known method, a position of braiding two coil wires is centrally held with a predetermined angle, and each of the coil wires is revolved around the other coil wire respectively.

In the case of braiding for example twelve coil wires for producing a coil assembly of three-phase coil wires, a method is known where two coil-wire-bundles each having six bundled coil wires are bundled by these first and second methods.

As shown in FIG. 9, a conventional coil wire bunch 80 is braided such that each of the coil wires 81 is mutually offset in the axial direction thereof and intersects, respectively. The coil wires 81 have a turn portion 82 and a straight slot-accommodated-portion 83. Each of the turn portions 82 and each of the slot-accommodated-portions 83 are aligned at every predetermined spacing, respectively.

In the case of braiding two coil wire bunches 80, a spacing "b" between coil wire bunches 80 which are braided to the other coil wire bunches 80 is narrowed, and the spacing necessary for braiding is not sufficient.

In addition, the spacing "b" of the other coil wire bunches 80 is narrowed by increasing the number of coil wires used in the coil wire bunches 80.

Furthermore, when the spacing "b" of the other coil wire bunch 80 is expanded, an aligned condition of the coil wires needs to be broken.

In this case, after the two coil-wire-bunches 80 are braided, a restoring process which restores the initial aligned condition is needed. Further, this restoring process is likely to develop a problem such as interference between each of the coil wires and scratching, thus the slot-accommodated-portions may be deformed thereby. Due to deforming the coil wires when the braided coils are formed in an awkward shape, a desired coil assembly is unable to be obtained.

SUMMARY OF THE INVENTION

In consideration of the above situation, it is an object of the present invention to provide a coil wire used for a coil assembly of a rotating electrical machine which has enough spacing to be braided when coil wire bunches (having a plurality of coil wires which are bunched), are braided.

A plurality of coil wires of the invention is braided for forming a coil assembly of a rotating electrical machine. Each of the coil wires has a predetermined length, a plurality of straight portions and a plurality of turn portions. The straight portions linearly extend in parallel in a first direction substantially perpendicular to the length direction of the coil wires. The turn portions connect two of the straight portions to be adjacent via first-kinked-portions and second-kinked-portions. The first-kinked-portions are kinked in a second direction substantially perpendicular to both the first direction and the length direction of the coil wires. The second-kinked-portions are kinked in a third direction substantially opposite to the second direction so that the turn portions are formed in a wave-shape in the length direction of said coil wires.

When at least two of the coil-wire-bunches are braided, the spacing of an insert position at which one coil-wire-bunches are braided to the other coil-wire-bunches is widened.

The space in braiding of the coil-wire-bunches is sufficiently secured.

Because an aligned condition of the coil-wire-bunches which are formed by the braided coil wires can be maintained, increasing the complexity of a process for braiding the coil assembly and occurrence of the awkward shape of the coil assembly are prevented.

Further according to the present invention, a stator for a rotating electrical machine is provided as follows.

This stator is comprised of a stator core and a coil assembly. The stator core is formed in substantially circular form and has a plurality of slots in the circumferential direction of the stator core. The coil assembly is formed by braiding a plurality of coil wires. Each of the coil wires has a predetermined length, a plurality of slot-accommodated-portions and a plurality of turn portions. The slot-accommodated-portions are disposed in the slots of the stator core, and linearly extend in parallel in a first direction substantially perpendicular to the length direction of the coil wires. Each of the turn portions is arranged on the outside of either-or both ends of the stator core, and connects two of the in-slot-portions to be adjacent via a of first-kinked-portions and a plurality of second-kinked-portions respectively. The first-kinked-portions are kinked in a second direction substantially perpendicular to both the first direction and the length direction. The second-kinked-portions are kinked in a third direction substantially opposite to the second direction so that the turn portions are formed in a wave-shape in the length direction of the coil wires.

Specifically, the first and the second kinked portions are twisted such that a corresponding one of the turn portions intersect an axis line which goes through the centers of the spacings between the adjacent straight portions of each of the coil wires.

The turn portions are braided so that each of the coil wires is mutually offset in a length direction of the coil wires relative to the turn portion of an adjacent coil wire and intersects. Also, each of the turn portions is formed in a staircase shape, respectively.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5A is a elevation view illustrating a portion of a coil wire of the preferred embodiment, FIG. 5B is a plan view thereof, and FIG. 5C is a side view thereof;

FIG. 6A is a plan view illustrating an enlarged scale of the portion of the coil wire of the preferred embodiment, FIG. 6B is a plan view thereof, and FIG. 6C is a side view thereof;

DETAILED DESCRIPTION OF THE PREFERRED EMBODIMENTS

Figure 1A:
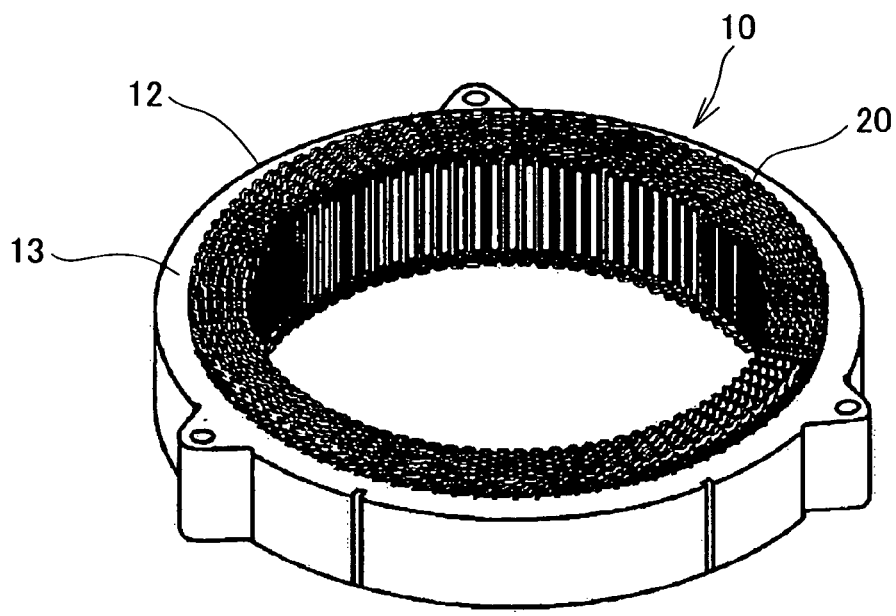
FIG. 1A is a perspective view illustrating the appearance of a stator of a rotating electrical machine which includes a coil assembly manufactured by a preferred embodiment of this invention.

Referring to the drawings, there is shown a preferred embodiment of a coil wire for a coil assembly of a rotating electrical machine of the present invention.

Firstly, an outline of a stator core 10 of a rotating electrical machine of the present invention is described. The stator core 10 of the rotating electrical machine is applied to a coil assembly fabricated by coil wire of the preferred embodiment of the present invention.

Figure 1B:
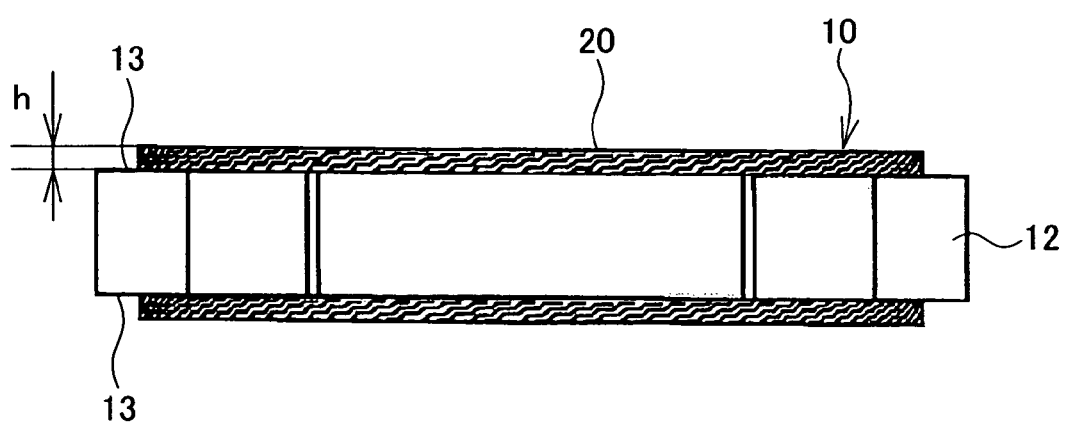
FIG. 1B is a side view of the stator thereof.
Figure 2:
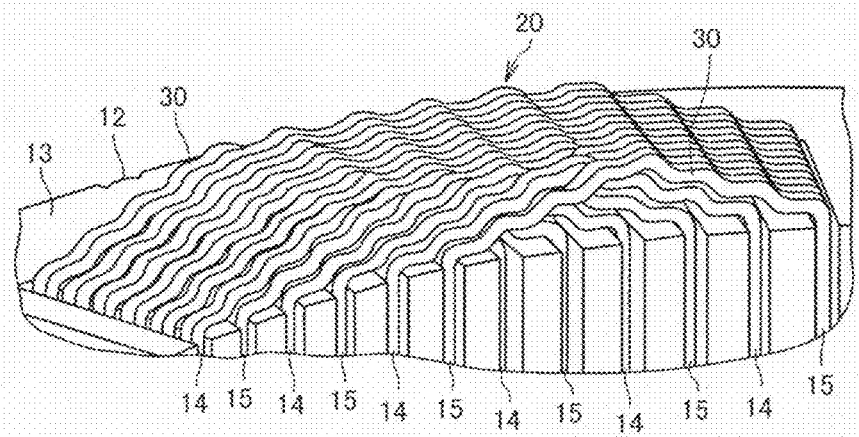
FIG. 2 is a perspective view illustrating an enlarged scale of a portion of the stator.
Figure 3:
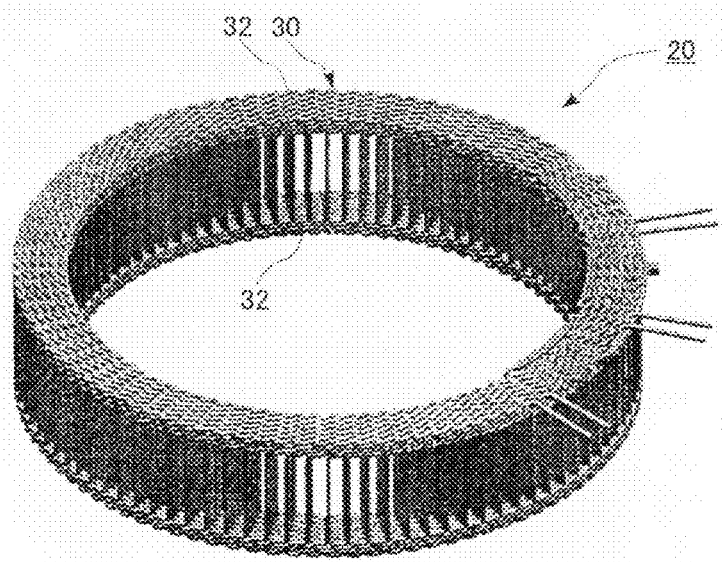
FIG. 3 is a perspective view of appearance of a coil assembly.
Figure 4:
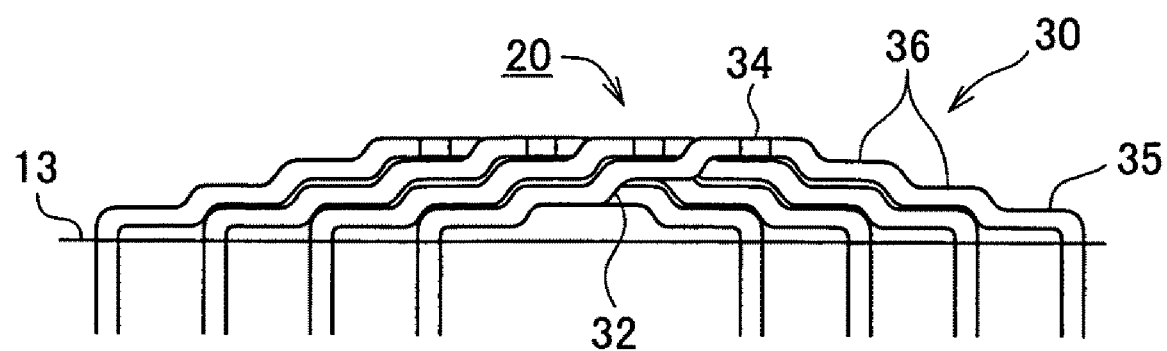
FIG. 4 is a elevation view illustrating a coil end of the coil assembly.

Referring to FIG. 1, the stator 10 is used for such as a rotating electrical machine which is combined with an electrical motor and an electrical generator in vehicles. The stator 10 rotatably accommodates a rotor (not shown) in an inner circumferential side thereof. The rotor has a plurality of magnetic poles made from permanent magnets such that each of the magnetic poles is alternately disposed in a circumferential direction thereof respectively. The magnetic poles are established on an outer circumferential side of the rotor as facing to an inner circumference side of the stator 10. A stator core 12 is formed in a circular pattern by laminating magnetic sheet steels in the axial direction thereof, each sheet having a predetermined thickness. The stator core 12 has, as shown in FIG. 2, a plurality of slots 14 and 15 which are established along the axial direction of the stator core and slots 14 and 15 are abutted in the circumferential direction relative to each other. A coil assembly 20 used for a stator winding of the preferred embodiment is a three-phase winding. Each of the phase windings is disposed in a pair of the adjacent slots 14 and 15 in the circumferential direction of the stator core 12. Specifically, those slots 14 and 15 are paired, the coil windings of different phase are disposed in three pairs of slots 14 and 15 of the adjacent circumferential direction of the stator core 12, respectively.

Secondly, compositions of the coil assembly 20 are explained.

A coil wire 30 used for the coil assembly 20 has, as shown in FIG. 2, a plurality of slot-accommodated-portions 31 which are accommodated into the slots 14 and 15 of the stator core 12, and a plurality of turn portions 32 connecting to each of the slot-accommodated-portions 31 which are disposed in the different slots in the circumferential direction of the stator core 12. The turn portions extend from both ends of the slots 14, 15 of the stator core 12 in axial direction of the stator core 12. A stator winding (i.e., the coil assembly) is formed by wave winding the coil wires 30 to the stator core 12.

This coil wire 30 is provided with, as shown in FIG. 5B, the plurality of the slot-accommodated-portions 31 and the plurality of the turn portions 32.

The plurality of the slot-accommodated-portions 31 is formed in a straight shape, and is positioned in parallel in a substantially vertical direction (a first direction) relative to a length direction (as will hereinafter be described axis line). Each of the plurality of the turn portions 32 is connected to one end of each of the adjacent slot-accommodated-portions 31, as shown in FIG. 5B. When the coil wires 30 are established in the stator core 20, odd-numbered turn portions and even-numbered turn portions of the coil wire 30 are alternately-positioned such that the odd-numbered turn portions are offset by 180 degrees of electrical angle from the even-number turn portions.

Referring to FIG. 6A, kinked portions 41 and 42 are formed in both ends of the turn portion 32. The kinked portions 41 and 42 are kinked in a width direction of coil wire 30 (i.e., in up and down of a vertical direction of FIG. 6A).

The kinked portions 41 and 42 are kinked like a wave form of each of the kinked portions 41 and 42 in the overhead view (i.e., FIG. 5A) relative to the axis line. The axis line goes along a center of turn portions in an overhead view (i.e., FIG. 5A) and a substantially center of a spacing of two of the slot-accommodated-portions to be adjacent in an side view (i.e., FIG. 5B).

Further specifically, as shown in FIG. 5A, the kinked portion 41 is kinked upward in FIG. 5A (second direction), and the kinked portion 42 is kinked downward in FIG. 5A (third direction).

A kinking amount of those kinked portions 41 and 42 is preferred to establish at least a spacing which a coil wire can pass through. That is, this kinking amount is required to be decided according to the length of the turn portion 32 of the coil wire 30.

Specifically, assuming that side "m" is defined as the side from a center portion 34 of the turn portion 32 of the coil wire 30 to the slot-accommodated-portion 31;

side "n" is defined as the side from the slot-accommodated-portion 31 to the center portion 34 of the turn portion 32a of the coil wire 30; and angle θ is defined as the angle between those sides "m" and "n".

Preferably angle θ has the spacing such that at least one of the coil wires 30 can be inserted into a space at least twice the gap width between the axis line L and the center of turn portions 32. However, even if the double width of the interspaces is smaller than the one of the coil wires 30, it has enough benefit.

The length of the turn portion 32 of the coil wire 30 is appropriately decided by the size of established stator windings or the number of the coil wire bundles.

As evidenced above, each of the coil wires 30 of the invention has a predetermined length, a plurality of straight portions (slot-accommodated-portions 31) and a plurality of turn portions 32. The straight portions linearly-extend in parallel in a first direction (upper direction of FIG. 5B) substantially perpendicular to the length direction of the coil wires each other. The turn portions connect two of the straight portions to be adjacent via first-kinked-portions (kinked portions 41) and second-kinked-portions (kinked portions 42). The first-kinked-portions are kinked in a second direction (upper direction of FIG. 5A) substantially perpendicular to both the first direction and the length direction of the coil wires. The second-kinked-portions are kinked in a third direction (lower direction of FIG. 5B) substantially opposite to the second direction so that the turn portions are formed in a wave-shape in the length direction (axis line L) of said coil wires.

In the case of forming the stator winding by braiding of twelve coil wires, one of the methods is that a coil wire bundle is formed by braiding of six coil wires 30 with each other, and two coil wire bundles are further braided with each other in the final process.

The coil wire bundles which are composed of six coil wires having the kinked portions 41 and 42 are explained as follow.

Figure 8A:
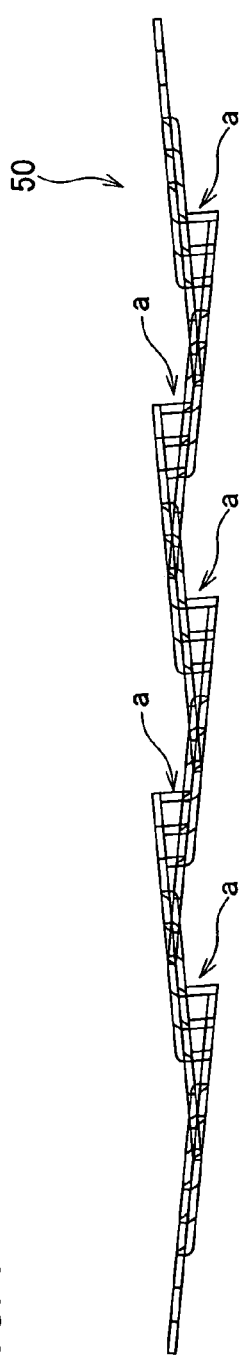
FIG. 8A is a plan view illustrating a portion of a coil wire bunch bunched with six coil wires.
Figure 8B:
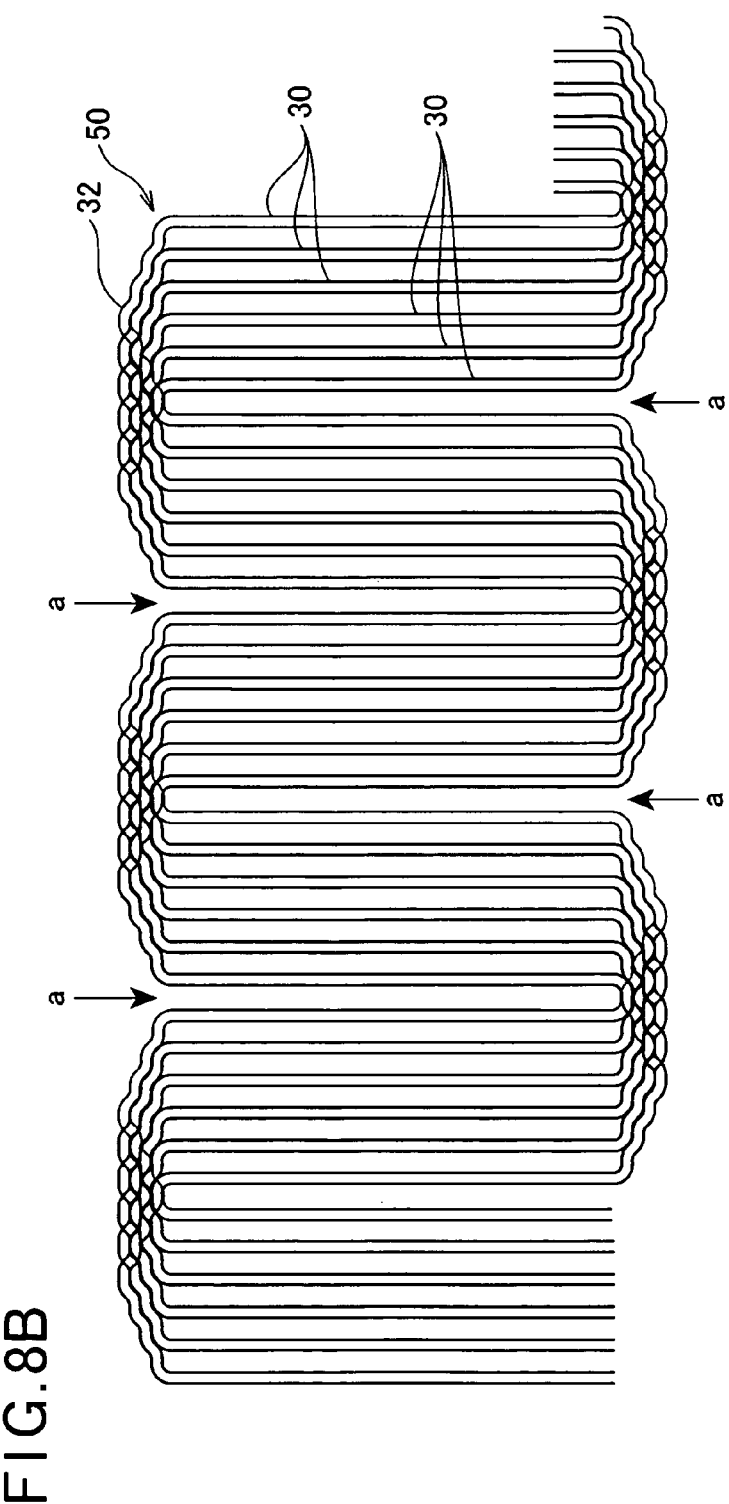
FIG. 8B is a elevation view thereof.
Figure 9:
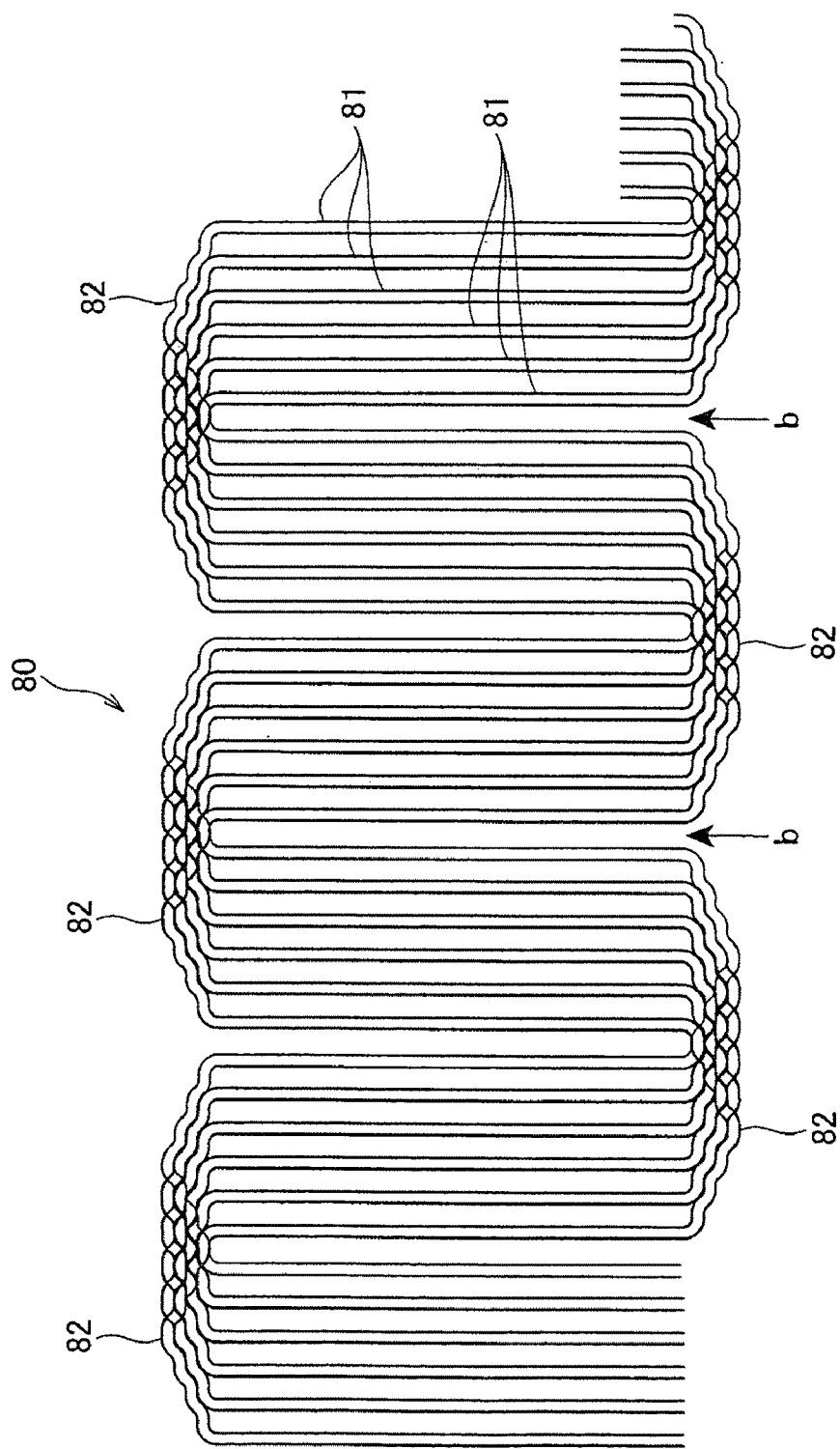
FIG. 9 is a elevation view of a conventional coil wire bunch.

As shown in FIG. 8B, each of the coil wires 30 was displaced by a predetermined distance in the circumferential direction at the time that the coil wires 30 were established as the stator winding (horizontal direction of FIG. 8B). Each of the coil wires 30 is positioned in parallel so as to cross the adjacent coil wires in the turn portions of the coil wires 30 respectively.

Specifically, when the stator winding satisfies the following conditions:

the upper side of FIG. 8A illustrates the outside of the stator winding;

the lower side of FIG. 8A illustrates the inside of the stator winding;

the turn portions 32 of the coil wires 30 of the upper side of the FIG. 8B illustrate the turn portions 32 extending to the axial direction of the stator core 12 from a top end face 13; and the turn portions 32 of the coil wires 30 of the lower side of the FIG. 8B illustrate the turn portions 32 extending to the axial direction of the stator core 12 from an under surface (not shown).

Each of a upper-side-turn-portions 32 of the coil wires 30 (i.e., the upper side of the turn portions 32 of the coil wires 30 in FIG. 8B) is sequentially crossed toward the outside of the stator winding (i.e., upper side of the FIG. 8A). Also, each of a lower-side-turn-portions 32 of the coil wires 30 (i.e., the lower side of the turn portions 32 of the coil wires in FIG. 8B) is sequentially crossed toward the inside of the stator winding (i.e., lower side of the FIG. 8A).

Thereby, as shown in FIG. 8A, in between two upper-side-turn-portions 32 of the coil wires 30 (the upper side of the turn portions in FIG. 8B), in other words, in a center of one of the lower-side-turn-portions, a plurality of spacing "a" extending toward the inside of the stator winding (the lower side of FIG. 8A) is established.

Equally, in between two lower side turn portions 32 of the coil wires 30 (the lower side of the turn portions in FIG. 8B), in other words, in a center of one of the upper side turn portions, a plurality of spacing "a'" extending toward the inside of the stator winding (the lower side of FIG. 8A) is established.

As a result, the spacing of the coil wire bundles 50 required for the braiding is secured sufficiently. That facilitates the braiding of two bundles of the coil wire bundles 50. Because an alignment condition of the coil wire bundles does not have to broken, increasing of the number of processes and/or occurring of deformation of the coil wires is prevented.

In addition, the kinked portions 41 and 42 composing the turn portion 32 used for the braiding of the coil wire bundles are straightened out when the braided coil wire bundles are formed to a doughnut-shaped coil assembly. For this reason, a restoring process of the deformed turn portions is not required, if the deformation amount of the turn portions is chosen in consideration of the change in a shape when the doughnut-shaped coil is formed.

Referring to FIG. 6A, preferably the turn portion 32 has a crank portion 33 in a center portion 34 thereof. The crank portion 33 is formed in a crank shape along the end faces 13 of the stator core 12. A shift length of the crank portion 33 is substantively equal to a width of the coil wire 30.

Thereby, each of the coil wires 30 which abuts in a radial direction when the stator winding is installed, is densely coiled. As a result, the width in the radial direction of the coil ends is made smaller, and prevented from protruding towards the outside of the radial direction of the coil assembly 20.

It is preferred that the crank portion 33 is established in the center portion 34 of the turn portion 32, although other methods can be used.

Referring to FIG. 6B, preferably, the turn portion 32 of the coil wires 30 has a stepped portion 35 and 36 which is formed in a staircase pattern. In both ends of the turn portion 32 of the coil wires 30, that is, in positions protruding towards the outside of the stator core 12 from the slots 14 and 15 which are established in the stator winding, the stepped portions 35 are formed. Also, in between this stepped portion 35 and the center portion 34 of the turn portion 32 of the coil wires, the stepped portions 36 are further established.

Thereby, the turn portions 32 of the coil wires 30 protruding from the slots 14 and 15 are made smaller, and increasing the height "h" of the coil ends is prevented.

Also, a length of the stepped portions 35 along the end face 13 of the stator core 12 is equal or shorter than a length of a spacing in between the adjacent slots 14 and 15 in a circumference direction of the stator core, and increasing the width of coil ends in the radial direction is prevented.

As a result, the stator 10 is more miniaturized.

A number of the stepped portion 35 and 36 of the turn portions 32 of the coil wires 30 of the further preferred embodiments is described as follows.

In the case of using a three-phase stator winding, because each of the phases of the coil wires 30 per one poles of a rotor is established in two slots 14 and 15, the total number of the slots per one poles of the rotator of the coil assembly which is successively adjoined in circumference direction thereof is 3×2=6.

For example, in the case of using coil wire bundles which are composed of the six coil wires 30, one slot-accommodated-portion 31 is installed to the slot which is six slots away from the slot (14 or 15) accommodating the other slot-accommodated-portion 31 in the circumference direction of the stator winding when the coil wires 30 are established in the stator winding. So that the slot-accommodated-portion 31 is installed in the six slots remote slot, seven slots are required.

In this case, as described in this preferred embodiment, preferably the turn portions 32 of the coil wires 30 are formed in four steps. These turn portions 32 of the coil wires have six of the stepped portions 35 and 36 respectively. The turn portions 32, further including the center portion 34 of the turn portions 32, have seven stepped portions.

By making the same number of the slots and the steps, the coil wires 30 are arranged closely, and thereby each of the turn portions 32 of the coil wires 30 is made smaller. As a result, the height of the coil ends is made shorter, and width in circumference direction of the coil ends is made smaller.

In addition, it is preferred that the turn portions 32 of the coil wires 30 are formed by four steps to have the seven stepped portions, although other methods can be used.

Figure 7:
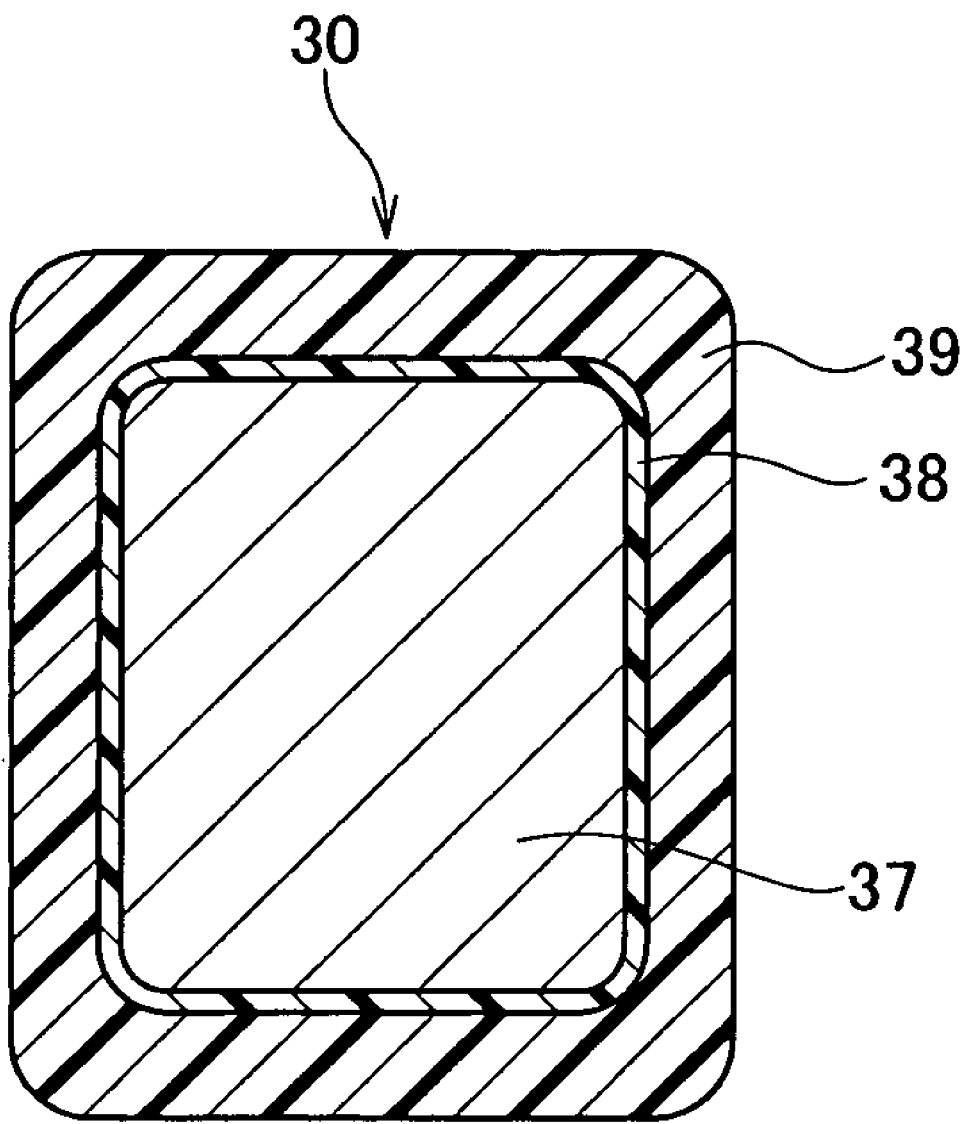
FIG. 7 is a sectional view of the coil wire of the preferred embodiment.

The coil wires 30 are formed, as shown in FIG. 7, by a copper-conducting-body 37 and an insulating film comprising an inner layer 38 and an outer layer 39 which coat an outer circumference of the conducting body 37 in order to insulate the conducting body 37. The inner layer 38 coats the outer circumference of the conducting body 37, the outer layer coats an outer circumference of the inner layer 38. Preferably, the outer layer is made of insulating materials such as nylon resins, and the inner layer is made of materials which have higher glass-transition temperature than the outer layer such as thermoplastic resins or polyamide-imide resins.

The total thickness of the insulating film of which the inner layer 38 and the outer layer 39 are added is set between 100 μm and 200 μm.

Because the insulating film has enough thickness, it is not necessary to provide materials such as insulating papers between the coil wires so as to insulate the coil wires 30. The materials and the thickness of the inner layer and the outer layer are described as mentioned above, but are not intended as a definition of the limits of the invention.

As mentioned above, in the coil-wire-bundles bundled by a predetermined condition, the turn portions of the coil wires of the invention are bent alternately in the radial direction when the coil-wire-bundles are established in the coil winding.

When two coil-wire-bundles 50 are bundled, the spacing of an insert position of which one coil-wire-bunches are braided to the other coil-wire-bunches is widened. Thereby, the space in braiding of the coil wire bunches is sufficiently secured.

Because an alignment condition of the coil wire bundles does not have to broken, increasing of the number of processes and/or occurring of deformation of the coil wires is prevented.

Incidentally, the coil assembly 20 is completed by that two bundles of the six coil wires are bundled, each of the coil wires is appropriately rotated and moved in parallel respectively, and accommodates so that the turn portions 32 of the coil wires 30 cross and overlap in a suitable condition, and then ends of the coil wires are glued in a plurality of points, the entirety is formed to a doughnut-shape.

What is claimed is:

1. A plurality of coil wires braided to each other for forming a coil assembly for a rotating electric machine in which:
   each of the coil wires has a predetermined length, a plurality of straight portions and a plurality of turn portions; said straight portions linearly extending in parallel to each other in a first direction substantially perpendicular to a length direction of said coil wires and substantially parallel to an axis of the coil assembly, each of said turn portions connecting adjacent two of said straight portions along the length of the respective coil wire alternately via a first-kinked-portion and a second-kinked-portion, respectively, said first-kinked-portions being kinked in a second direction substantially perpendicular to both the first direction and the length direction of said coil wires, said second-kinked-portions being kinked in a third direction substantially opposite to the second direction so that said turn portions are formed in a wave-shape in the length direction of said coil wires, wherein
   each of the turn portions has first steps leading to the adjacent two straight portions and a center portion located between the first steps, the first steps and the center portion each extending substantially perpendicular to the straight portions, the center portion being located farther from the straight portions than the first steps in the first direction, the center portion having a crank portion bent in a plane of the center portion that is substantially perpendicular to the first direction.

2. A plurality of coil wires as set forth in claim 1, wherein said first and said second kinked-portions are kinked relative to an axis line of each of the coil wires at said straight portions.

3. A plurality of coil wires as set forth in claim 1, wherein each of said turn portions further has a second step between each first step and the center portion, with the first and second steps extending between the center portion and each adjacent straight portion in a staircase pattern.

4. A stator core for a rotating electrical machine comprising:
   a stator core being formed in substantially circular form and having a plurality of slots in a circumferential direction of the stator core;
   a coil assembly being formed by braiding a plurality of coil wires;
   each of said coil wires has a predetermined length, and including a plurality of in-slot-portions and a plurality of turn portions, said in-slot-portions being disposed in said stator core slots, and said in-slot-portions linearly extending in parallel in a first direction substantially perpendicular to the length direction of said coil wires and substantially parallel to an axis of the coil assembly, each of said turn portions being arranged outside of either-or both ends of said stator core, and said turn portions connecting adjacent two of said in-slot-portions along the length of the respective coil wire alternately via a first-kinked-portion and a second-kinked-portion, respectively, said first-kinked-portions being kinked in a second direction substantially perpendicular to both the first direction and the length direction, said second-kinked-portions being kinked in a third direction substantially opposite to the second direction so that said turn portions are formed in a wave-shape in the length direction of said coil wires, wherein
   each of the turn portions has first steps leading to the adjacent two straight portions and a center portion located between the first steps, the first steps and the center portion each extending substantially perpendicular to the straight portions, the center portion being located farther from the straight portions than the first steps in the first direction, the center portion having a crank portion bent in a plane of the center portion that is substantially perpendicular to the first direction.

5. A stator core as set forth in claim 4, wherein said first and second kinked-portions are kinked relative to an axis line of each of the coil wires at said straight portions.

6. A stator core as set forth in claim 4, wherein said turn portions are braided so that said turn portions of the coil wires to be adjacent are mutually offset in the length directions of said coil wires and cross each other.

7. A plurality of coil wires as set forth in claim 4, wherein each of said turn portions further has a second step between each first step and the center portion, with the first and second steps extending between the center portion and each adjacent straight portion in a staircase pattern.

* * * * *